(No Model.)

I. A. WESTON.
WHEEL HUB.

No. 598,041. Patented Jan. 25, 1898.

WITNESSES:

INVENTOR
Irving A. Weston
BY
Smith & Denison
his ATTORNEYS.

UNITED STATES PATENT OFFICE.

IRVING A. WESTON, OF SYRACUSE, NEW YORK.

WHEEL-HUB.

SPECIFICATION forming part of Letters Patent No. 598,041, dated January 25, 1898.

Application filed April 30, 1896. Serial No. 589,759. (No model.)

*To all whom it may concern:*

Be it known that I, IRVING A. WESTON, of Syracuse, in the county of Onondaga, in the State of New York, have invented new and useful Improvements in Wheel-Hubs, of which the following, taken in connection with the accompanying drawings, is a full, clear, and exact description.

My invention relates to hubs for vehicle-wheels, and particularly to devices for oiling the axle-bearings thereof.

My object is to provide a wheel-hub with an improved device or mechanism for oiling its bearings, as the ball-bearings in a cycle-wheel, in which or by which the oil is conducted direct to the bearings after the nozzle of the oiler has been inserted into an oil-hole in the barrel of the hub and deposited upon an inclined conduit, which is normally spring-pressed outwardly to close said hole and which yields under pressure to permit of the insertion of the oiler, an auxiliary or supplementary oil-guide being provided, when necessary, and by which the oil is kept in each bearing, the yielding closure and conduits conducting the oil onto said guide. It is constructed as follows, reference being had to the accompanying drawings, in which—

Figure 1:
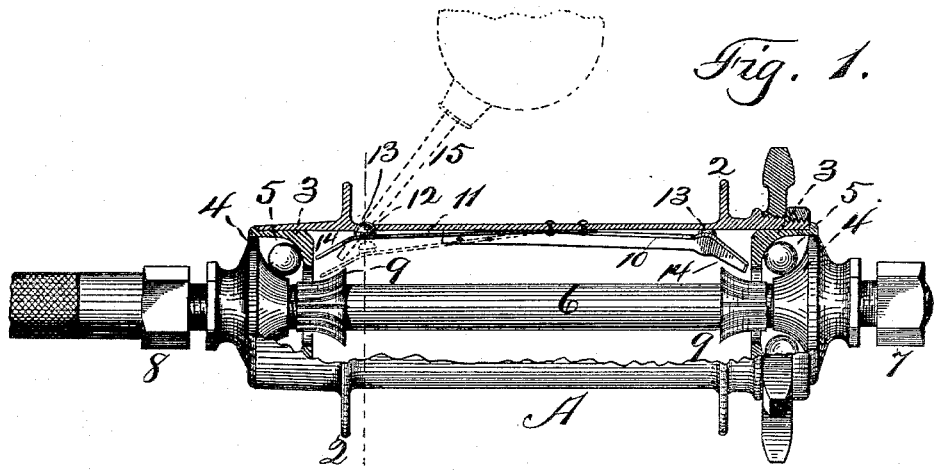
Figure 2:
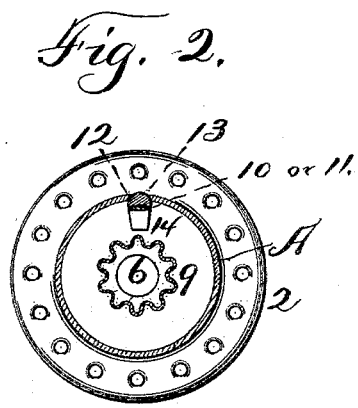

Figure 1 is a sectional elevation of the rear hub of a cycle. Fig. 2 is a cross-section of the same upon the dotted line.

A is the barrel of the hub, provided with spoke-flanges 2, ball-races 3, cones 4, balls 5, shaft 6, and nuts 7 8 thereon, all of which are of any ordinary construction and constitute no part of my invention.

Upon the shaft oil-cones 9 are secured, either corrugated or plain as to their exterior, and having their outer ends projecting substantially to the ball-bearings, respectively, but not forming a part of said bearings themselves.

Spring-arms 10 11 are secured within the barrel and adapted to normally close the oil-holes 12, as by a plug or stud 13, to exclude dust, &c., each arm having its outer end 14 exterior to said stud bent at an angle to the body of said spring, thereby creating an inclined oil-conduit on each spring extending substantially to each ball-bearing. This conduit may be flat or concaved like a trough. The stud 13 is spring-pressed outwardly to normally close an oil-hole and exclude dust and other substances deleterious to the bearings. To oil a bearing, the nozzle 15 of an oil-can is applied to said stud, forcing it inwardly, opening the oil-hole, the point of said nozzle being then upon said inclined conduit and the end of said conduit being then close to said ball-bearing and possibly in contact with the oil-cone. The oil then deposited upon said conduit then flows down over the incline, either directly into said bearing or onto the oil-cone, and flows down its inclined face into said bearing. The cones also operate as dams to retain the oil in said bearings and prevent it from running onto the axle 6 between said cones and being wasted. It will thus be seen that the studs 13 are moved to open or close the oil-holes, and the oil-conduits 14 are also moved by the insertion of the oiling-nozzle, its removal, and the spring action of said springs 10 11.

What I claim as my invention, and desire to secure by Letters Patent, is—

1. In a hub, a stationary axle, the curved oil-cone secured thereto, and extending at its outer end partially through the ball-race, the hub provided with the oil-hole adjacent to the cone, and the spring-arm for closing said hole, combined with the ball-race, balls, and the cone placed upon the axle, whereby the oil-cone is made to conduct the oil directly to the balls, substantially as shown.

2. The combination with a tubular barrel-hub, an axle, and its bearings therein, of springs secured at one end within said hub-barrel and each provided with a stud 13 normally closing the oil-holes therein, and each provided with an inclined oil-conduit upon its free end to conduct the oil substantially into the adjacent bearing, and adapted to be sprung inwardly by the insertion of the nozzle of an oiler into an oil-hole, and dams upon said axle interior to the respective bearings to retain the oil in them.

3. The combination with a tubular barrel-hub, an axle, and its ball-bearings therein, of dams upon the axle interior to each of said bearings, and having their faces inclined toward said bearings to both conduct oil applied thereto into said bearings and retain it therein.

In witness whereof I have hereunto set my hand this 27th day of April, 1896.

IRVING A. WESTON.

In presence of—
C. W. SMITH,
HOWARD P. DENISON.